United States Patent [19]

Hausdörfer et al.

[11] 4,295,156

[45] Oct. 13, 1981

[54] METHOD FOR PRODUCING COLOR TELEVISION SIGNALS

[75] Inventors: Michael Hausdörfer, Mühtal; Jürgen Heitmann, Seeheim, both of Fed. Rep. of Germany

[73] Assignee: Robert Bosch GmbH, Stuttgart, Fed. Rep. of Germany

[21] Appl. No.: 124,478

[22] Filed: Feb. 25, 1980

[30] Foreign Application Priority Data

Mar. 2, 1979 [DE] Fed. Rep. of Germany ....... 2908273

[51] Int. Cl.$^3$ .............................................. H04N 9/02
[52] U.S. Cl. ..................................................... 358/12
[58] Field of Search .............................. 358/12, 13, 15

[56] References Cited

U.S. PATENT DOCUMENTS 2,716,151  8/1955  Smith .............................. 358/12 X

FOREIGN PATENT DOCUMENTS 695251  8/1953  United Kingdom .
698949  10/1953  United Kingdom .
715506  9/1954  United Kingdom .

Primary Examiner—Robert L. Richardson
Attorney, Agent, or Firm—Frishauf, Holtz, Goodman & Woodward

[57] ABSTRACT

To transmit color video information from one point to another within a color television studio complex, particularly for distribution of source signals which are intended to be processed in a digital mode at another location in the studio, the information is transmitted in form of a color television signal comprising a luminance component having a given frequency range and a carrier frequency chrominance component having a frequency range outside that of the luminance component, the chrominance component simultaneously obtaining the full color information for the luminance component. The selected mode permits the ready separation of the luminance and chrominance components without perceptible quality losses, and recording and cutting processing.

7 Claims, 3 Drawing Figures

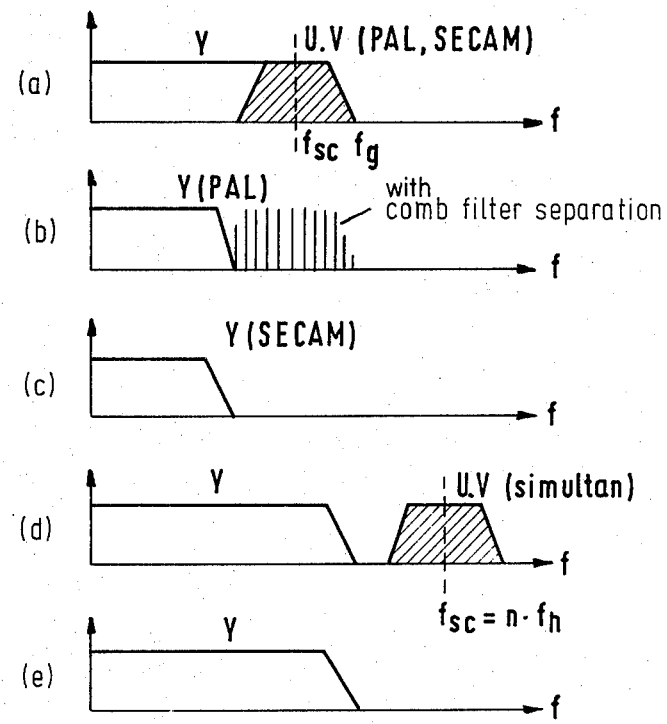
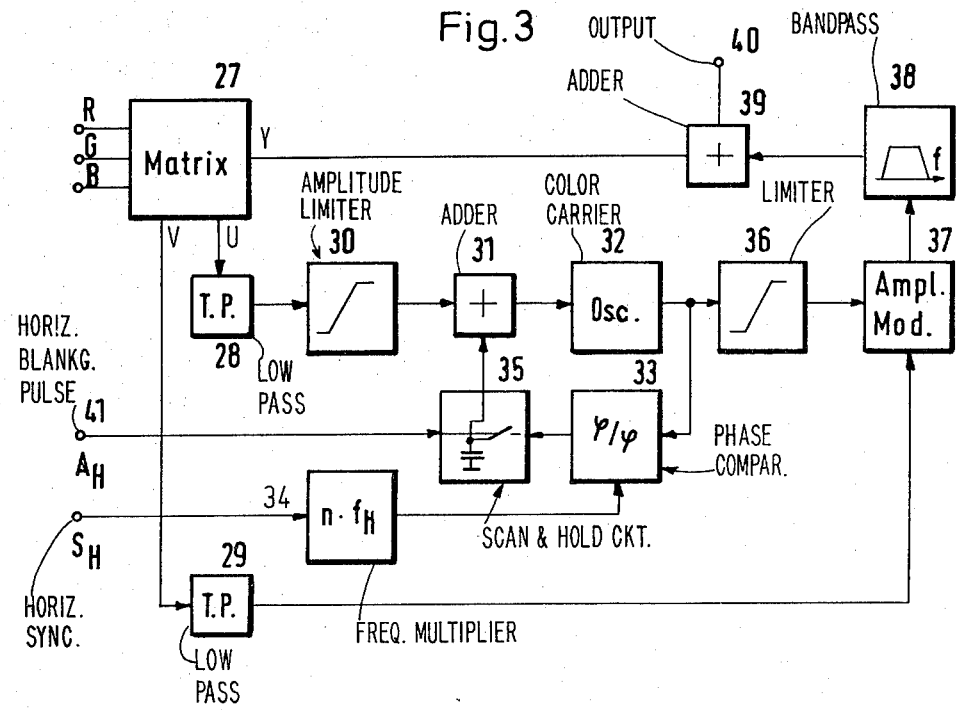

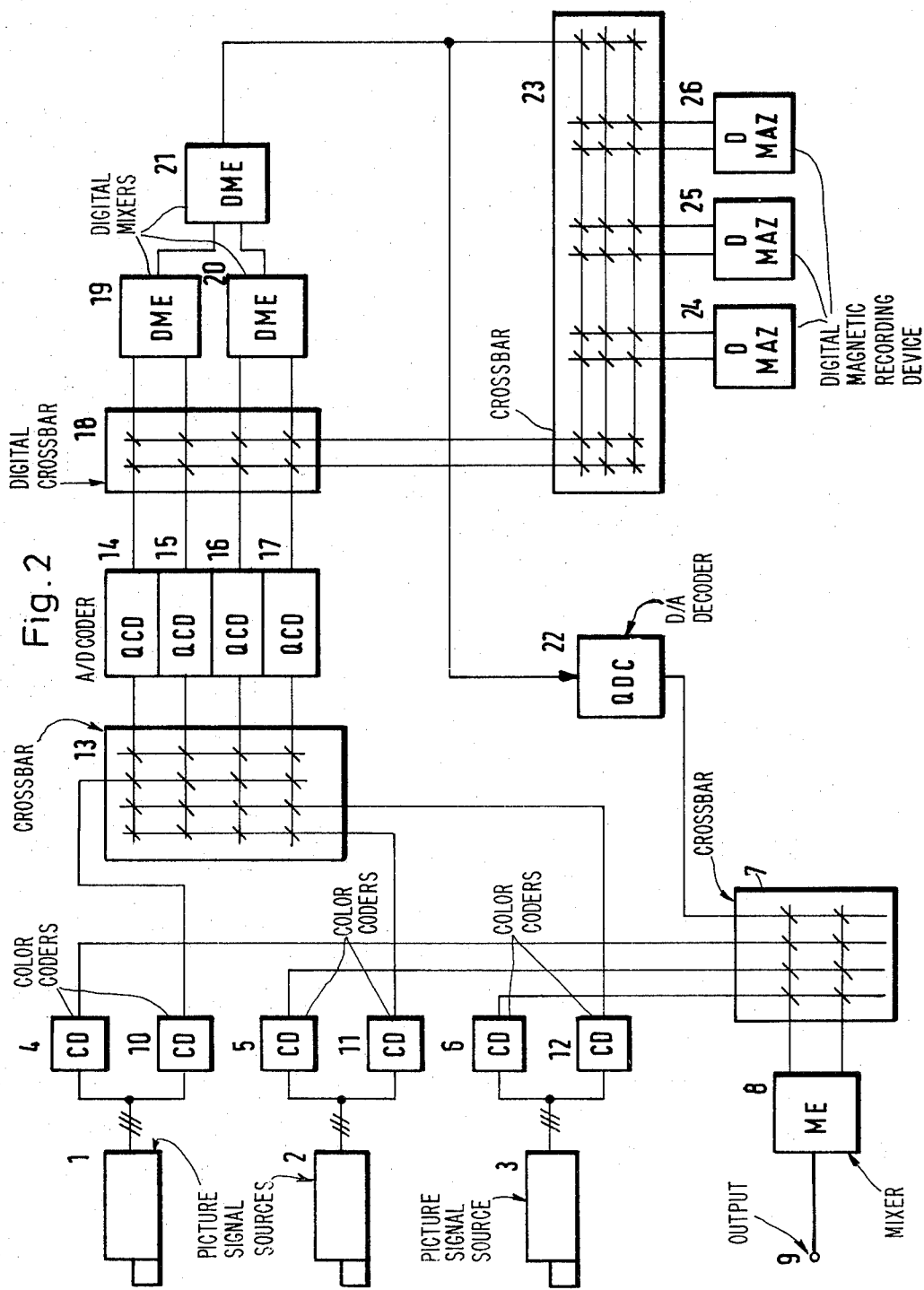

METHOD FOR PRODUCING COLOR
TELEVISION SIGNALS

The invention relates to a method for the production of colour television signals, in particular for transmission within studio complexes.

BACKGROUND

Existing standards for the broadcasting of colour television signals (NTSC, SECAM and PAL) take into account the characteristics of the television receiver, particularly with respect to compatibility with monochrome television receivers and availability of established transmission channels.

In order to avoid the operation of transcoding, which involves additional expense and degradation of quality, it has been the usual practice in television studio complexes to transmit or distribute the colour television signals from place to place within the studio complex in the same standard form (NTSC, PAL or SECAM) as that in which they are eventually broadcast in the country concerned. Because the above mentioned colour television standards are basically suitable for the distribution or transmission of colour television signals within the studio, this method has in the past not encountered any serious difficulties. Any particular disadvantages determined by the characteristics of the above mentioned standards, for example problems involved in the mixing of SECAM signals, could be overcome.

With the increasing introduction of digitally operating studio equipment—synchronizers, digital recording devices, digital mixing devices—it has become necessary to an increasing extent to perform the conversion of analog colour television signals into digital signals and to reconvert them. This conversion and reconversion can be necessary at several different stages in the path taken by the signals from the signal source (for example a colour television camera or film scanner) to the broadcast transmitter.

Basically there are two known techniques for performing this conversion, firstly the component encoding, i.e. closed coding technique wherein a colour television signal available according to one of the above standards is sampled as such and digitized, and secondly the component encoding, i.e. open or separate coding technique wherein a colour television signal available according to one of the above standards is divided into its individual luminance and chrominance components and the components are then individually sampled and digitized. Both methods possess disadvantages: in the case of the closed coding technique a high data rate results from the necessary relationship between the sampling frequency and the colour carrier frequency, and this high data rate presents difficulties in recording; on the other hand the separate coding technique requires a division of the analog coded signal, resulting in an inherent loss of quality. Both methods produce a digital data stream which is distributed in the form of either a parallel bit stream or a serial bit stream in the studio. Among the disadvantages of the parallel bit stream is that which occurs, for example, when it is necessary to make a selection among a plurality of digital signal sources, because there may be the necessity of simultaneously switching up to 8 or more lines.

SUMMARY OF THE INVENTION

According to the present invention a colour television signal, as received from cameras, for example, is converted, for performing studio-commanded operations thereon, into a studio signal by combining a luminance component having a given frequency range with a carrier frequency chrominance component having a frequency range outside that of the luminance component, the chrominance component simultaneously containing the full colour information for the luminance component; this permits component encoding, and ready conversion into digital form, thus facilitating studio signal processing.

The method has the advantages that it is possible to transmit the television signal produced thereby over long distances within a studio complex without degrading its quality, and it is possible to convert the signal into digital form or into a signal of standard form (PAL, SECAM or NTSC) without significant loss of quality. These advantages are of particular importance in studio complexes which comprise partly analog and partly digital equipment.

BRIEF DESCRIPTION OF THE DRAWINGS

An embodiment of the invention will now be described with reference to the accompanying drawings, wherein:

FIG. 1 is a schematic diagram of the frequency ranges of various television signals to aid in understanding the invention, FIG. 2 is a block schematic diagram of a colour television studio complex in which the method according to the invention is used, and FIG. 3 is a block schematic diagram of a circuit arrangement forming part of FIG. 2.

DESCRIPTION OF THE PREFERRED EMBODIMENT

In FIG. 1 the line a shows the spectrum of a PAL or SECAM television signal. The luminance component Y extends up to a certain limiting frequency fg which is conventional colour television systems is greater than 5 MHz, and contains in the upper frequency region thereof the chrominance component consisting of carrier-frequency colour difference signals U and V. A spectral line corresponding to the frequency of the colour carrier is indicated by $f_{sc}$. In the SECAM system two colour carrier frequencies are provided alternating line by line. In all colour television systems which exhibit such a spectrum, a separation of the luminance and chrominance components, for example for the purpose of open digital coding, can be effected by a frequency separator; however, the frequency range of the luminance signal is severly limited by this operation. This is shown in line c of FIG. 1 for the SECAM system. Alternatively, in the PAL (or NTSC) colour television systems the chrominance signal can be separated from the luminance signal by means of a comb filter which, although leaving a wideband luminance signal, nevertheless causes other disturbances. The spectrum of the luminance signal Y after separation by a comb filter is shown at line b of FIG. 1.

In contrast to the above, a typical television signal produced and transmitted within a studio according to the invention exhibits the spectrum shown at line d. A spacing adequate for the satisfactory separation of the luminance and chrominance components (e.g. by simple frequency separation) is provided between the frequency range for the luminance component Y and that for the chrominance component U, V. Accordingly, the luminance signal Y remains substantially unimpaired by the step of separation both in the case of quadrature modulated colour television signals as well as in the SECAM system, as is schematically shown at line e of FIG. 1. Thus the linear superposition of luminance and chrominance components is avoided, so that subsequent separation of these components is possible without significant losses in quality.

The further advantages of the invention will now be described with reference to FIGS. 2 and 3.

FIG. 2 represents a block schematic diagram of a colour television studio complex, wherein both analog as well as digital equipment is employed.

Several picture signal sources 1, 2 and 3, which may be colour television cameras or colour television film scanners, deliver primary colour signals R, G, B. These are delivered to respective colour coders 4, 5 and 6 for generating conventional analog colour television signals, for example according to the PAL standard. These signals are delivered to a crossbar arrangement 7. The signals selected by means of the crossbar arrangement 7 arrive at a mixing device 8 and are available at the output terminal 9 thereof—for example for broadcast transmission.

Besides the conventional coders 4, 5 and 6 there are connected to the respective outputs of the picture signal sources 1, 2 and 3 further colour coders 10, 11 and 12. These further coders, of which a practical example will be described later with reference to FIG. 3, generate colour television signals having the form provided by the present invention and whose typical spectrum is shown in FIG. 1, line d.

These further signals are delivered to a crossbar arrangement 13 and can by this means be selectively connected to source analog-to-digital coders 14, 15, 16 and 17.

These source coders may operate either according to the open or separate or component coding technique or according to the closed or composite coding technique. As discussed above, the component coding comprises the separation of the components of a color tv signal and the analogue to digital conversion of these components. The composite coding means the analogue to digital conversion of the color tv signal without separating the components from each other. It is possible to apply each of these methods to the digital part of the studio according to FIG. 2 which comprises the units 18 to 26. The signal can be processed in the studio, and hence will be referred to as the studio signal. It is converted into digital form for rease of processing as will appear.

In case of the composite coding the source coder 14 to 17 comprise one analogue to digital converter each, whilst the source decoder 22 consists of a digital to analogue converter. A decoder such as decoder 22, is the counterpart of the encoder, or simply the coders 10 to 12 can be identical to the coders 4 to 6.

In the case of component coding technique in the digital system of the studio according to FIG. 2, the source coder 14 to 17 may comprise coders which are the counterparts of the coders 10 to 12 described in connection with FIG. 3, below and additionally include analogue to digital converters for the derived components. The decoder 22 then consists of a digital to analogue converter for each of the components and of one coder according to the coders 4, 5, and 6 to reconstitute the studio signal in standard form for application to the mixer 7.

The digital signals produced by the source coders 14 to 17 are then delivered through a digital cross bar arrangement 18 to digital mixing devices 19 and 20. The output signals of the digital mixing devices 19 and 20 are delivered to a further digital mixing device 21. The digital output signals of the mixing device 21 can then be converted in the source coder 22 into a conventional colour television signal and delivered to the crossbar arrangement 7.

The output signals of the mixing device 21 can also be delivered, through a further crossbar arrangement 23, to digital magnetic recording devices 24, 25 and 26. The digital magnetic recording devices can, on the one hand, serve for recording the signals delivered through the mixing devices 19, 20 and 21 and, on the other hand, directly record the output signals of the source coders 14, 15, 16 and 17 for which purpose the crossbar arrangements 18 and 23 are directly interconnected.

In a corresponding manner it is also possible to feed into the crossbar arrangement 18 the signals delivered from the digital magnetic recording devices 24, 25 and 26, to process them with the signals coming from the picture signal sources 1, 2 and 3 by means of the mixing devices 19, 20 and 21, and to convey them to the broadcast transmitter through the source coder 22, the crossbar arrangement 7 and the mixing device 8.

It is to be understood that the above is merely a typical studio arrangement and illustrates how it is possible by the use of the method to install both analog as well as digital studio equipment in a variety of combinations while avoiding signal conversions which, previously, resulted in substantial impairment of signal quality.

FIG. 3 shows a practical example of an arrangement for the generation of the special television signals used in the above studio complex. The primary colour signals R, G, B are delivered to a conventional matrix 27 at whose outputs there are produced the luminance signal Y and the two colour difference signals U and V. By means of low-pass elements 28 and 29 the bandwidth of the colour difference signals is limited, for example, to 1.5 MHz. In the practical example of FIG. 3 one of the colour difference signals is transmitted in frequency modulated form and the other is amplitude modulated. Thus, for example, the band-limited colour difference signal U is passed through an amplitude limiter 30 in order to avoid excessive swings in the frequency modulation, and is delivered to an adding circuit 31. By means of a phase comparison circuit 33 the phase of the output voltage of a colour carrier oscillator 32 is compared with the phase of pulses whose frequency represents an integral multiple of the line frequency. For this purpose there is provided at the circuit 33, through a frequency multiplying circuit 34, the horizontal frequency component $S_H$ of the synchronizing signal. The output voltage of the phase comparison circuit 33 is taken through a scanning and holding circuit 35 to a further input of the adding circuit 31. In this manner the frequency of the oscillator 32 is modulated by the colour difference signal U. At 41 a horizontal frequency blanking pulse $A_H$ is fed to the scanning and holding circuit 35.

The frequency modulated output voltage of the oscillator 32 is delivered to a limiter circuit 36 in order to eliminate any amplitude fluctuations resulting from the frequency modulation. The output signal of the limiter circuit 36 is then taken to a known type of amplitude modulator 37 for modulation by the signal V which is also delivered to the modulator 37. The colour carrier thus modulated both in respect of frequency and amplitude arrives at a bandpass unit 38 having a pass range corresponding to that frequency range which is to be allocated to the chrominance signal (hatched area in FIG. 1 line d). The chrominance signal is then added to the luminance signal Y in an adding circuit 39. A colour television signal having the special form provided by the present embodiment of the invention is then available at the output 40.

Instead of the arrangement of FIG. 3 wherein one of the colour difference signals is provided in frequency modulated form and the other amplitude modulated form, an alternative is possible in which both colour difference signals are provided in quadrature amplitude-modulated form. In this case, as contrasted with the known method of quadrature amplitude modulation, a carrier may be employed having a frequency corresponding to an integral multiple of the line frequency. Such colour television signals can then be mixed even when in the analog mode by means of conventional mixing devices. Moreover, in contrast to the known method with a quadrature amplitude modulation, it is here not necessary to take into account a sequence extending over a plurality of fields. For the purpose of such quadrature modulation, suitable circuits are described for example by W. D. Greigg in "Analog and Digital Communication", New York 1977, page 346 et seq.

When transmitting a signal which is as well amplitude as frequency modulated linear disturbances influence only the amplitude, in the example, the amplitude of the amplitude modulated color difference signal. This would result in a chromatic error. In order to prevent such chromatic error, a sync pulse is applied to the signals before they are transmitted according to this invention, as follows:

1. The amplitude of the sync pulses, being part of the demodulated color difference signals is compared with the amplitude of that sync pulse which is contained in the luminance signal. The result of this comparison is used to control the amplitude of the demodulated color difference signal especially the amplitude of that color difference signal which has been transmitted by amplitude modulation.

2. Alternatively, the amplitude of the sync signal of the demodulated color difference signal which has been transmitted by means of amplitude modulation, is compared with a reference amplitude. The result of this comparison is used to control the amplitude of said color difference signal as mentioned above. The reference amplitude can be derived as a value located between the synchronous level and the black value.

We claim:

1. A method of performing operations on a color television signal in a color television studio complex, in which said color television signal is derived in analog form from a picture sensing means, said derived signal having a luminance component (Y) and a chrominance component (U, V), the chrominance component having a carrier frequency located in the upper frequency region of the luminance component, said method comprising the steps of converting said derived signal into a studio processing signal by separating the chrominance component (U, V) from the luminance component (Y) to derive a chrominance component having the full-color information for the luminance component;

generating a studio carrier for the chrominance component which is outside of the frequency range of the luminance component and of higher frequency than said luminance component;

modulating said studio carrier with said chrominance component carrying the full-color information for the luminance component to form a studio chrominance signal component, said studio chrominance signal component and said separate luminance component together forming said studio processing signal, in which said luminance component has a first frequency range and said studio carrier, modulated by the chrominance component, has a higher frequency range outside of said first frequency range;

performing said operations on the studio processing signal;

and then reconverting said studio processing signal in a form similar to that of the derived signal.

2. Method according to claim 1, wherein the step of converting said derived signal into the studio processing signal further includes the step of converting said signal components into digital signals by component coding of said studio chrominance signal component and the luminance component to permit performing said operations on the thus digitized studio processing signal in digital form.

3. Method according to claim 1, wherein said step of generating said studio carrier comprises generating a carrier which is an integral multiple of line frequency.

4. Method according to claim 1, further including the step of deriving separate color difference signal (U, V) in quadrature amplitude-modulated form.

5. Method according to claim 1, wherein the step of modulating the studio carrier comprises frequency modulating a first color difference signal on said carrier and amplitude modulating a second color difference signal on said carrier.

6. Method according to claim 5, including the step of demodulating the amplitude-modulated color difference signal to obtain a reference value for demodulation and to permit obtaining a constant amplitude signal for frequency modulation by said first color difference signal.

7. Method according to claim 6, wherein said reference value is located between the synchronous level and the black value.

* * * * *